US008359488B2

(12) United States Patent
Costa

(10) Patent No.: US 8,359,488 B2
(45) Date of Patent: Jan. 22, 2013

(54) KEEPING TIME IN MULTI-PROCESSOR VIRTUALIZATION ENVIRONMENTS

(75) Inventor: Glauber de Oliveira Costa, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 439 days.

(21) Appl. No.: 12/758,658

(22) Filed: Apr. 12, 2010

(65) Prior Publication Data

US 2011/0252266 A1 Oct. 13, 2011

(51) Int. Cl.
*G06F 1/12* (2006.01)
*G06F 15/16* (2006.01)

(52) U.S. Cl. ......................................... 713/400; 713/375

(58) Field of Classification Search .................. 713/375, 713/400, 500
See application file for complete search history.

(56) References Cited

U.S. PATENT DOCUMENTS

| 7,139,225 | B2 * | 11/2006 | Farmer | 368/46 |
| 7,512,826 | B2 * | 3/2009 | Armstrong et al. | 713/375 |
| 7,870,411 | B2 * | 1/2011 | Fraser et al. | 713/375 |
| 2002/0078243 | A1 * | 6/2002 | Rich et al. | 709/248 |
| 2004/0003123 | A1 * | 1/2004 | Kwon | 709/248 |
| 2008/0126820 | A1 | 5/2008 | Fraser et al. | |
| 2008/0306710 | A1 * | 12/2008 | Holtzman et al. | 702/178 |
| 2011/0055479 | A1 * | 3/2011 | West et al. | 711/118 |

FOREIGN PATENT DOCUMENTS

JP 2006302270 A * 11/2006

OTHER PUBLICATIONS

Chen, Siming, et al., "Implementation of Virtual Time System for the Distributed Virtual Machine Monitor," 2009 ISECS International Colloquium on Computing, Communication, Control, and Management, 978-1-4244-4246-1/09 © 2009 IEEE, downloaded Mar. 31, 2010 from IEEE Xplore, pp. 571-576.
"Timekeeping in VMware Virtual Machines, VMware® ESX 3.5/ESXi 3.5, VMware Workstation 6.5," VMware Information Guide, Copyright © 2008 VMware, Inc., Revision: 20081017, Item: WP-065-PRD-02-02, 26 pages.
"vmi_spec.txt, Paravirtualization API Version 2.5," Copyright © 2005, 2006, VMware, Inc., 34 pages.

* cited by examiner

*Primary Examiner* — Paul R Myers
(74) *Attorney, Agent, or Firm* — Lowenstein Sandler PC

(57) ABSTRACT

A virtual machine receives a request for a current time. The virtual machine determines an approximation of the current time based on readings from one of a plurality of processors and compares the approximation to a virtual machine time stamp value. If the approximation is smaller than the virtual machine time stamp value, the virtual machine returns the global time stamp value as the current time and if the approximation is not smaller than the virtual machine time stamp value, the virtual machine returns the approximation as the current time.

21 Claims, 4 Drawing Sheets

KEEPING TIME IN MULTI-PROCESSOR VIRTUALIZATION ENVIRONMENTS

TECHNICAL FIELD

Embodiments of the present invention relate generally to virtualized systems, and more specifically to keeping time in virtualization environments having multiple processors.

BACKGROUND

One of the most important requirements of most computer systems is to be able to accurately report the current time. Therefore, in a virtualization environment, the virtual machine must be able to provide fast and accurate time readings. Current timing solutions, however, are problematic in multi-processor virtualized systems that make frequent use of time readings. Because synchronizing clocks between time sources is not possible in any physical device, small deviations in accuracy are inevitable in multi-processor systems and are acceptable as long as the time seen by users and processes on the virtual machine always moves forwards and never appears to go backwards. Current solutions, however, are unable to quickly provide a current time reading without occasionally making such a mistake (reporting an earlier time than previously reported).

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for keeping time in a virtualized environment are described herein. In one embodiment, a virtual machine receives a request for the current time. The virtual machine determines an approximation of the current time based on a time stamp reading taken from one of a plurality of processors and compares the approximation to a virtual machine time stamp value. If the approximation is less than the virtual machine time stamp value, the virtual machine returns the virtual machine time stamp value as the current time. If the approximation is not less than the virtual machine time stamp value, the virtual machine returns the value of the approximation as the current time. In one embodiment, if the approximation is not less than the virtual machine time stamp value, the virtual machine generates a computed value based on the approximation and updates the virtual machine time stamp with the computer value. In one embodiment, the computed value is based on a combination of the approximation and the global time stamp value. In some embodiments, the virtual machine adds the difference between the approximation and the global time stamp value to generate the computed value.

With embodiments of the invention, a virtual machine is able to give fast readings of the current time with reasonable accuracy and is able to ensure that the reported time never appears to move backwards.

Figure 1:
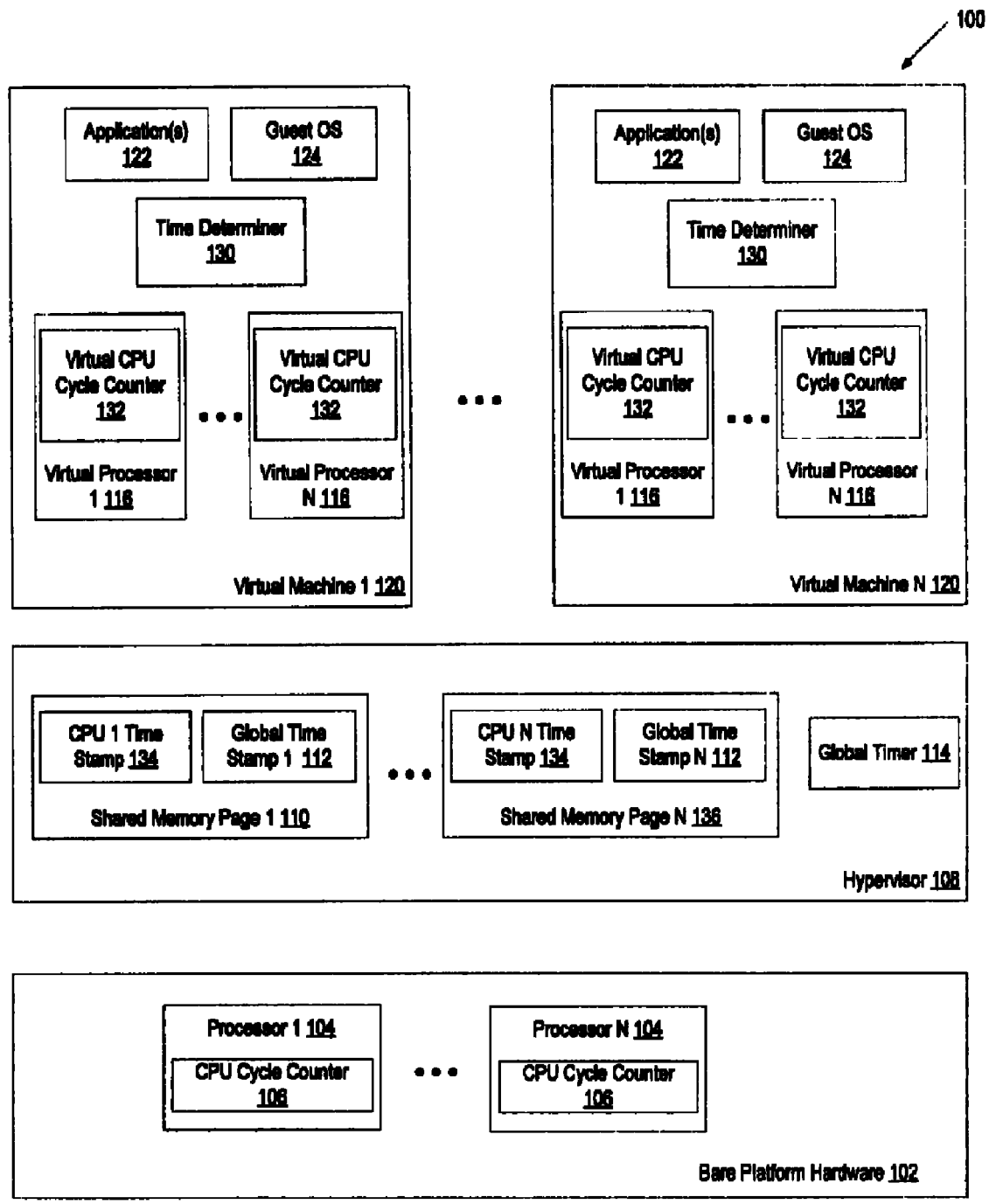
FIG. 1 illustrates an exemplary virtualization environment architecture in which embodiments of the invention may operate.

FIG. 1 illustrates an exemplary virtualization environment architecture 100 in which embodiments of the invention may operate. The virtualization environment 100 includes bare platform hardware 102. Bare platform hardware 102 may be a personal computer (PC), server computer, mainframe, or other computing system. Bare platform hardware 102 includes multiple processors (CPUs) 104, with each of the processors 104 having a CPU cycle counter 106. Bare platform hardware may also include memory, input/output devices, etc.

Processors 104 can be any type of processor capable of executing software, such as a microprocessor, digital signal processor, microcontroller, or the like. Processors 104 may also each have a CPU cycle counter 106. In many embodiments, CPU cycle counter 106 records the number of processor cycles. Because the frequency of the processor cycles is fixed, the counter can serve as a time stamp that is based on the number of cycles counted. The CPU cycle counter 106 may be a time stamp counter (TSC) present on many x86 processors, etc.

Virtualization environment 100 also includes a hypervisor 108 (also known as a virtual machine monitor). The hypervisor 108, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 108 presents to the higher level software (commonly referred to as "guest" software) the abstraction of one or multiple virtual machines (VMs) 120. The hypervisor 108 may provide the same or different abstractions to various guest software (e.g., guest operating system, guest applications, etc.).

In one embodiment, the hypervisor 108 is run directly on bare platform hardware. In another embodiment, the hypervisor 108 is run on top of a host OS (e.g., as a kernel module of a host OS). Alternatively, for example, the hypervisor 108 may be run within, or on top of, another hypervisor. Hypervisor 108 may be implemented, for example, in hardware, software, firmware or by a combination of various techniques.

Hypervisor 108 may include shared memory pages 110 and a global timer 114. Global timer 114 may make time readings from any one of multiple hardware timer devices used by computer systems to keep track of time. Global timer 114 may use a programmable interrupt timer (PIT), a CMOS real time clock (RTC), a high precision event timer (HPET), etc. In some embodiments, hypervisor 108 selects the timer device that is most accurate from one of several timer devices available to it in bare platform hardware 102.

Hypervisor 108 may record timer readings from global timer 114 as a global time stamp 112 located in each of the shared memory pages 110. Shared memory pages 110 may be shared with virtual machines 120. However, in one embodiment only hypervisor 108 has the ability to update the shared memory pages 110 with readings from global timer 114. In one embodiment, each of the shared memory pages 110 corresponds to one of the multiple processors 104. Whenever the hypervisor 108 runs on one of the processors 104, it may update the shared memory page 110 corresponding to that processor with a new value of a global time stamp 112 taken from global timer 114. In addition, the hypervisor 108 may also update a CPU time stamp 134 with a reading from the CPU cycle counter 106 located on the processor on which the hypervisor 108 is currently running. In one embodiment, hypervisor 108 updates both of these values concurrently or sequentially (e.g., hypervisor 108 may update one value and then update the other immediately after). This ensures that the global time stamp 112 and the CPU time stamp 134 stored in each shared memory page 110 are taken at almost the same instance.

In some embodiments, a single shared memory page 110 may store multiple CPU time stamps 134 and/or multiple global time stamps 112 corresponding to multiple processors. In other embodiments, the CPU time stamps 134 and/or global time stamps 112 may be stored, for example, in one or more data stores rather than in shared memory pages.

Virtual machines (VMs) 120 are portions of software that, when executed on appropriate hardware, create an environment allowing the virtualization of an actual physical computer system. Each VM 120 may function as a self-contained platform, running its own operating system (guest OS 124) and software applications (processes) 122. Typically, the hypervisor 108 manages allocation and virtualization of computer resources and performs context switching, as may be necessary, to cycle between various VMs.

Virtual machines 120 can be, for example, hardware emulation, full virtualization, para-virtualization, and operating system-level virtualization virtual machines. Each virtual machine 120 includes a guest operating system (guest OS) 124 that hosts one or more applications 122 within the virtual machine. The guest OSes 124 running on the virtual machines 120 can be of the same or different types (e.g., two guest OSes may both be Windows® operating systems, or one may be a Windows® operating system and the other a Linux® operating system). Moreover, the guest OSes 124 and the host OS may share the same operating system type, or the host OS may be a different type of OS than one or more guest OSes 124. For example, a guest OS may be a Windows® operating system from Microsoft® and a host OS may be a Linux® operating system available from Red Hat.

Virtual machines 120 may include multiple virtual processors 116. In one embodiment, the virtual processors 116 are virtual representations of physical processors such as processors 104 and provide the appearance to the guest OS 124 that it is accessing a processor such as one of processors 104. Each of the virtual processors 116 may have a virtual CPU cycle counter 132. The virtual CPU cycle counters may be virtual representations of physical CPU cycle counters such as CPU cycle counters 106 and provide the appearance to the guest OS 124 that it is accessing a CPU cycle counter such as one of CPU cycle counters 106.

Virtual machines 120 may also include a time determiner 130. Time determiner 130 may receive a request for the current time from the guest OS 124 and/or applications 122, and then report the current time using information stored in the shared memory pages 110 (or data stores or other data structures). Techniques used by the time determiner 130 to accurately determine the current time are discussed below with reference to FIG. 2.

Figure 2:
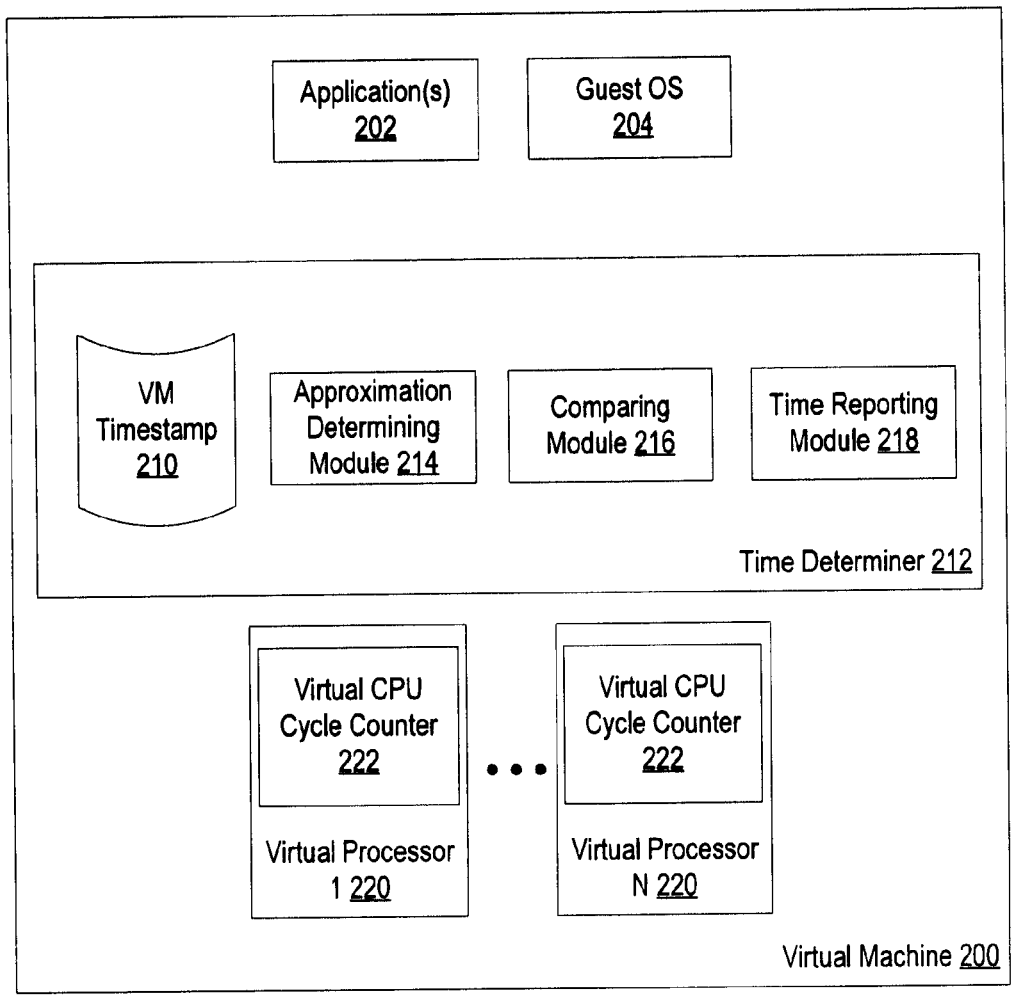
FIG. 2 is a block diagram of one embodiment of a virtual machine.

FIG. 2 is a block diagram of one embodiment of a virtual machine 200. The virtual machine 200 may correspond to one of virtual machines 120 of FIG. 1. The virtual machine 200 includes one or more applications 202, a guest operating system (guest OS) 204, a time determiner 212, multiple virtual processors 220 and multiple virtual CPU cycle counters 222.

Guest OS 204 may host the one or more applications 202 that run on the virtual machine 200. Applications (or processes) 202 and guest OS 204 may, as part of their normal function, need to know the current time, how much time has passed since a certain point, or other time-related information for which an accurate time keeping source is required. Virtual processors 220 may be virtual representations of physical processors and may give guest OS 204 and the applications 202 that it hosts the impression that they are accessing physical processors. Each of the virtual processors 220 may have a virtual CPU cycle counter 222 that is a virtual representation of a physical CPU cycle counter such as CPU cycle counters 106 of FIG. 1.

Time determiner 212 may include a Virtual Machine (VM) time stamp 210, an approximation determining module 214, a comparing module 216, and a time reporting module 218. Approximation determining module 214 may determine an approximation of the current time in response to a received request for the current time that is executed by one of the virtual processors 220. Such a request may be made by one of the applications or processes 202, by the guest OS 204 for scheduling or other purposes, etc.

In some embodiments, approximation determining module 214 includes a paravirtual clock device such as the paravirtual clock of the Kernel-based Virtual Machine (KVM) included in the RedHat® Enterprise Linux software package that it uses to approximate the current time. In these embodiments, approximation determining module 214, in response to a request for the current time that is executing on a particular virtual processor 220, reads the virtual CPU cycle counter 222 associated with the currently in-use virtual processor 220 to determine a current per-CPU time stamp for that virtual processor. In another embodiment, approximation determining module 214 may read a physical CPU cycle counter such as one of the CPU cycle counters 106 of FIG. 1 to determine the current per-CPU time stamp for a particular processor.

Approximation determining module 214 may then access a shared memory page that is associated with the virtual processor 220 that is executing the current time request. The shared memory page may contain a stored global time stamp and a stored per-CPU time stamp corresponding to the physical processor that virtual processor 220 represents. In one embodiment, this shared memory page is updated by a hypervisor on which the virtual machine 200 runs. The hypervisor may update the stored global time stamp and the stored per-CPU time stamp concurrently (e.g., nearly simultaneously) in order to ensure that both time stamps are taken at almost the same moment in time. There may be a shared memory page for every virtual processor 220 that the virtual machine 200 has. Alternatively, one shared memory page may store time stamps corresponding to multiple processors. In yet another embodiment, the time stamps may be stored in one or more data stores rather than in shared memory pages.

Approximation determining module 214 may subtract the stored per-CPU time stamp from the current per-CPU time stamp to determine how many processor cycles have elapsed since the stored global time stamp was updated by the hypervisor. Approximation determining module 214 then multiplies this number of cycles by a constant in order to convert it to the same time unit (e.g., nanoseconds) as the stored global time stamp. Approximation determining module 214 may add this value to the stored global time stamp to arrive at an approximation of the current time. By making the approximation in this manner, approximation determining module 214 is able to approximate the current time without querying a hypervisor, which ensures that the approximation is generated quickly.

Comparing module 216 compares the approximation generated by approximation determining module 214 with the last seen value of VM time stamp 210. VM time stamp 210 may be used in order to ensure that processes running on the virtual machine and users of the virtual machine never see time moving backwards. In some embodiments, time reporting module 218 may update the value of the VM time stamp 210 whenever it finds that the current time that it is reporting is greater than the value of the VM time stamp 210.

If the approximation is less than the last seen value of the VM time stamp 210, comparing module 216 instructs time reporter 218 to report the last seen value of the VM time stamp 210 as the current time.

However, if the value of the approximation is not less than the last seen value of the VM time stamp 210, the comparing module 216 instructs time reporting module 218 to report the approximation as the current time. In one embodiment, in order to ensure that time reporting module 218 never reports a current time that is less than a time that it has previously reported, time reporting module 218 also updates the VM time stamp 210 based on the approximation. Time reporting module may update the VM time stamp 210 to a value that equals the approximation plus the difference between the approximation and the existing last seen VM time stamp.

In one embodiment, the operation for updating the VM time stamp 210 is atomic. If, for example, two CPUs attempt to update the VM time stamp 210 at the same time, the attempt will only be successful if the new value is larger than the existing VM time stamp value (e.g., an attempt to update the VM time stamp 210 with a value that is smaller than the value already stored in the memory page would not be permitted). This ensures that the value of the VM time stamp 210 never decreases, and therefore that time never appears to move backwards in the virtualization environment.

Figure 3:
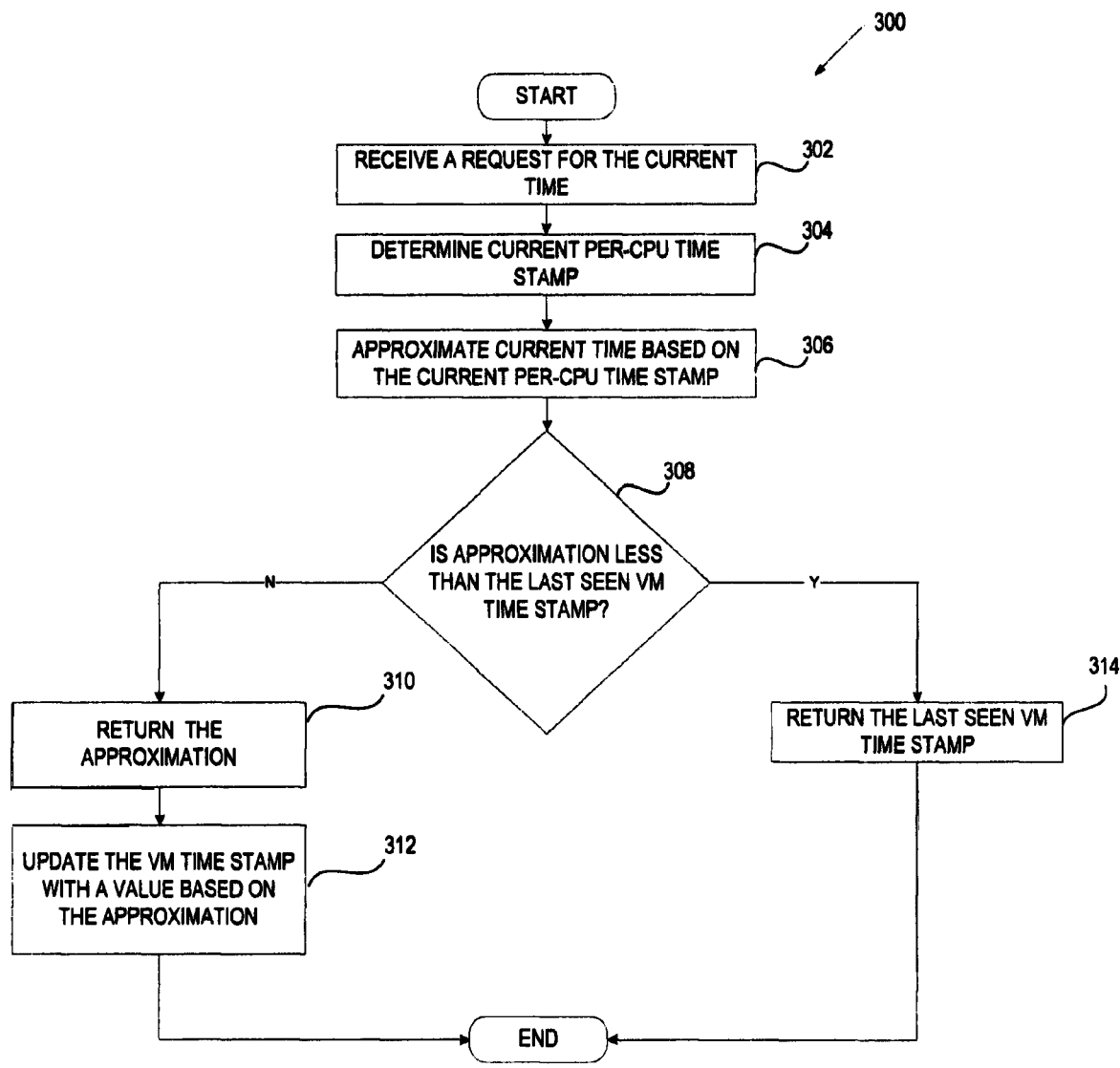
FIG. 3 is a flow diagram of one embodiment of a method for keeping time in a virtualized environment.

FIG. 3 is a flow diagram of one embodiment of a method 300 for keeping time in a virtualized environment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a virtual machine (e.g., virtual machines 120 of FIG. 1).

Referring to FIG. 3, processing logic receives a request for the current time at block 302. This request may be received from a process or application running on the virtual machine and being executed by one of several virtual processors of the virtual machine. Alternatively, the guest OS running on the virtual machine may request the current time for scheduling purposes.

At block 304, processing logic determines a current per-CPU time stamp of the virtual processor that is executing the request for the current time. In one embodiment, processing logic reads a virtual CPU cycle counter located on the virtual processor to determine the per-CPU time stamp. In another embodiment, processing logic reads the current per-CPU time stamp of the virtual processor from a physical CPU cycle counter located on the physical processor that the virtual processor is representing.

At block 306, processing logic uses the current per-CPU time stamp to approximate the current time. In one embodiment, processing logic accesses a stored global time stamp and a stored per-CPU time stamp taken at the same moment of time as the global time stamp. These may be stored in a shared memory page accessible to the virtual machine and shared by the virtual machine and an underlying hypervisor that updates the shared memory page. Each physical processor (and, therefore, each virtual processor on the virtual machine) may have a corresponding shared memory page with a corresponding processor-specific time stamp. Processing logic subtracts the stored per-cpu time stamp (TSS) from the current per-cpu time stamp (TSC) in order to obtain the number of processor cycles (C) that have elapsed since the stored global time stamp was taken (Equation 1).

$$TS_C - TS_S = C \quad (Eq. 1)$$

In order to convert the number of cycles to the same unit of time as the global time stamp, processing logic may multiply this difference (C) by a pre-determined constant (k). Processing logic then adds this value to the stored global time stamp (TSG) to determine an approximation (A) of the current time (Equation 2)

$$C*k + TS_G = A \quad (Eq. 2)$$

At block 308, processing logic compares the approximation (A) to a last seen value of a VM time stamp (TSVM). If the approximation is not less than the last seen value of the VM time stamp, processing logic returns the approximation as the current time at block 310. In order to ensure that time on the virtual machine cannot move backwards, processing logic also updates the value of the VM time stamp based on the approximation. In one embodiment, the new VM time stamp value is equal to the approximation plus the difference between the approximation and the last seen VM time stamp (Equation 3).

$$A \geq TS_{VM} \Rightarrow \text{new VM time stamp} = A + (A - TS_{VM}) \quad (Eq. 3)$$

At block 314, if the approximation is less than the value of the global time stamp, processing logic returns the value of the global time stamp as the current time (Equation 4) and no update of the VM time stamp is necessary.

$$A < TS_{VM} \Rightarrow \text{current time} = TS_{VM} \quad (Eq. 4)$$

According to embodiments of method 300, processing logic is able to return a current time quickly in response to a current time request while ensuring that the time that is returned is not less than a time that was returned in response to a previous request.

Figure 4:
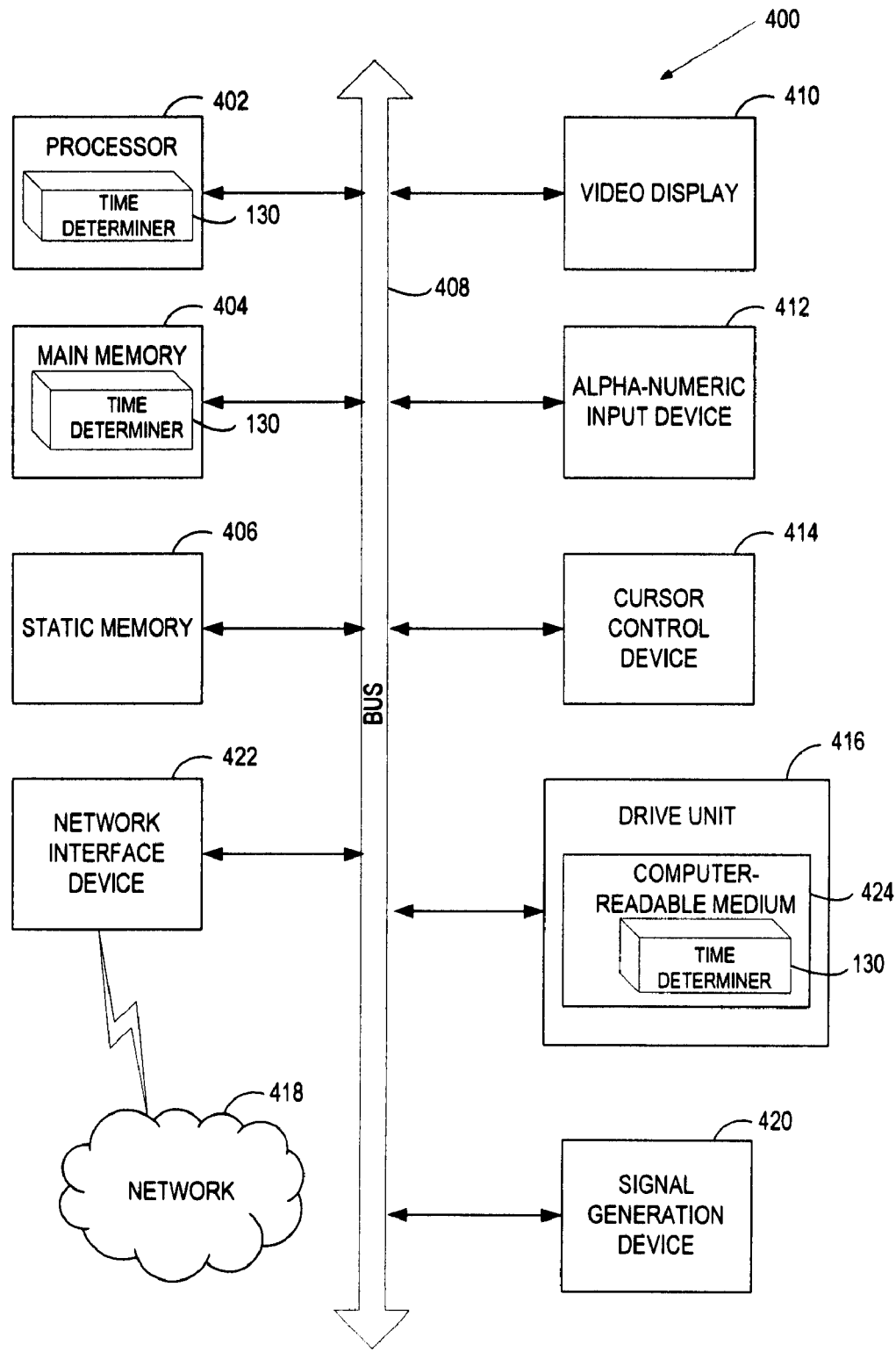
FIG. 4 is a block diagram of one embodiment of a computer system.

FIG. 4 is a block diagram of one embodiment of a computer system 400 for keeping time in a virtualized environment. Within the computer system 400 is a set of instructions for causing the computer system 400 to perform any one or more of the methodologies for keeping time. In alternative embodiments, the computer system 400 may be connected (e.g., networked) to other machines in a LAN, an intranet, an extranet, or the Internet. The computer system 400 can operate in the capacity of a server machine or a client machine in a client-server network environment, or as a peer machine in a peer-to-peer (or distributed) network environment. The computer system 400 may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies for keeping time discussed herein.

The exemplary computer system 400 includes one or more processing devices 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing devices 402 represent one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute instructions of time determiner 130 for performing the operations and steps for keeping time discussed herein.

The computer system 400 may further include a network device 422 (e.g., NIC, Ethernet network card, etc.). The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions of time determiner 130 embodying any one or more of the methodologies or functions for keeping time described herein. The instructions of the time determiner 130 may also reside, completely or at least partially, within the main memory 404 and/or within the processing device 402 during execution thereof by the computer system 400, the main memory 404 and the processing device 402 also constituting machine-readable storage media. The instructions of the time determiner 130 may further be transmitted or received over a network 418 via the network device 422.

The computer-readable storage medium 424 may also be used to store the instructions of the timer determiner 130 persistently. While the computer-readable storage medium 426 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features for keeping time described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "comparing," "returning," "generating" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations for keeping time described herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for keeping time in a virtualization environment with multiple processors has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
   receiving, by a virtual machine, a request for a current time;
   determining, by the virtual machine, an approximation of the current time based on readings from one of a plurality of processors;
   comparing the approximation to a virtual machine time stamp value;
   if the approximation is smaller than the virtual machine time stamp value, returning a global time stamp value as the current time; and
   if the approximation is not smaller than the virtual machine time stamp value, returning the approximation as the current time.

2. The method of claim 1, further comprising:
   if the approximation is not smaller than the virtual machine time stamp value, generating a computed value based on the approximation; and
   updating the virtual machine time stamp value to equal the computed value.

3. The method of claim 2, further comprising:
   generating the computed value based on a combination of the approximation and the virtual machine time stamp value.

4. The method of claim 3, wherein generating the computed value comprises adding the difference between the approximation and the virtual machine time stamp value to the approximation.

5. The method of claim 2, wherein updating the virtual machine time stamp value is done atomically.

6. The method of claim 1, wherein the approximation of the current time is based on a global time stamp value that is obtained from a hypervisor on which the virtual machine runs.

7. The method of claim 6, wherein the global time stamp value is calculated by the hypervisor from one of a plurality of hardware timer devices.

8. A computer readable storage medium including instructions that, when executed by a processing device, cause the processing device to implement a method for keeping time in a virtualization environment, the method comprising:
   receiving, by a virtual machine, a request for a current time;
   determining, by the virtual machine, an approximation of the current time based on readings from one of a plurality of processors;
   comparing the approximation to a virtual machine time stamp value;
   if the approximation is smaller than the virtual machine time stamp value, returning a global time stamp value as the current time; and
   if the approximation is not smaller than the virtual machine time stamp value, returning the approximation as the current time.

9. The computer readable storage medium of claim 8, the method further comprising:
   if the approximation is not smaller than the virtual machine time stamp value, generating a computed value based on the approximation; and
   updating the virtual machine time stamp value to equal the computed value.

10. The computer readable storage medium of claim 9, the method further comprising:
    generating the computed value based on a combination of the approximation and the virtual machine time stamp value.

11. The computer readable storage medium of claim 10, wherein generating the computed value comprises adding the difference between the approximation and the virtual machine time stamp value to the approximation.

12. The computer readable storage medium of claim 9, wherein updating the virtual machine time stamp value is done atomically.

13. The computer readable storage medium of claim 8, wherein the approximation of the current time is based on a global time stamp value that is obtained from a hypervisor on which the virtual machine runs.

14. The computer readable storage medium of claim 13, wherein the global time stamp value is calculated by the hypervisor from one of a plurality of hardware timer devices.

15. A system comprising:
    a memory; and
    a processor coupled with the memory to
      receive a request for a current time;
      determine an approximation of the current time based on readings from one of a plurality of processors;
      compare the approximation to a virtual machine time stamp value;
      if the approximation is smaller than the virtual machine time stamp value, return a global time stamp value as the current time; and
      if the approximation is not smaller than the virtual machine time stamp value, return the approximation as the current time.

16. The system of claim 15, wherein the processor is further to:
    if the approximation is not smaller than the virtual machine time stamp value, generate a computed value based on the approximation; and
    update the virtual machine time stamp value to equal the computed value.

17. The system of claim 16, wherein the processor is further to:
    generate the computed value based on a combination of the approximation and the virtual machine time stamp value.

18. The system of claim 17, wherein the processor is to generate the computed value by adding the difference between the approximation and the virtual machine time stamp value to the approximation.

19. The system of claim 16, wherein the processor is to update the virtual machine time stamp value atomically.

20. The system of claim 15, wherein the approximation of the current time is based on a global time stamp value that is obtained from a hypervisor.

21. The system of claim 20, wherein the global time stamp value is calculated by the hypervisor from one of a plurality of hardware timer devices.

* * * * *